(No Model.)
J. P. WARNER.
NUT LOCK AND RAIL JOINT.
No. 546,107. Patented Sept. 10, 1895.
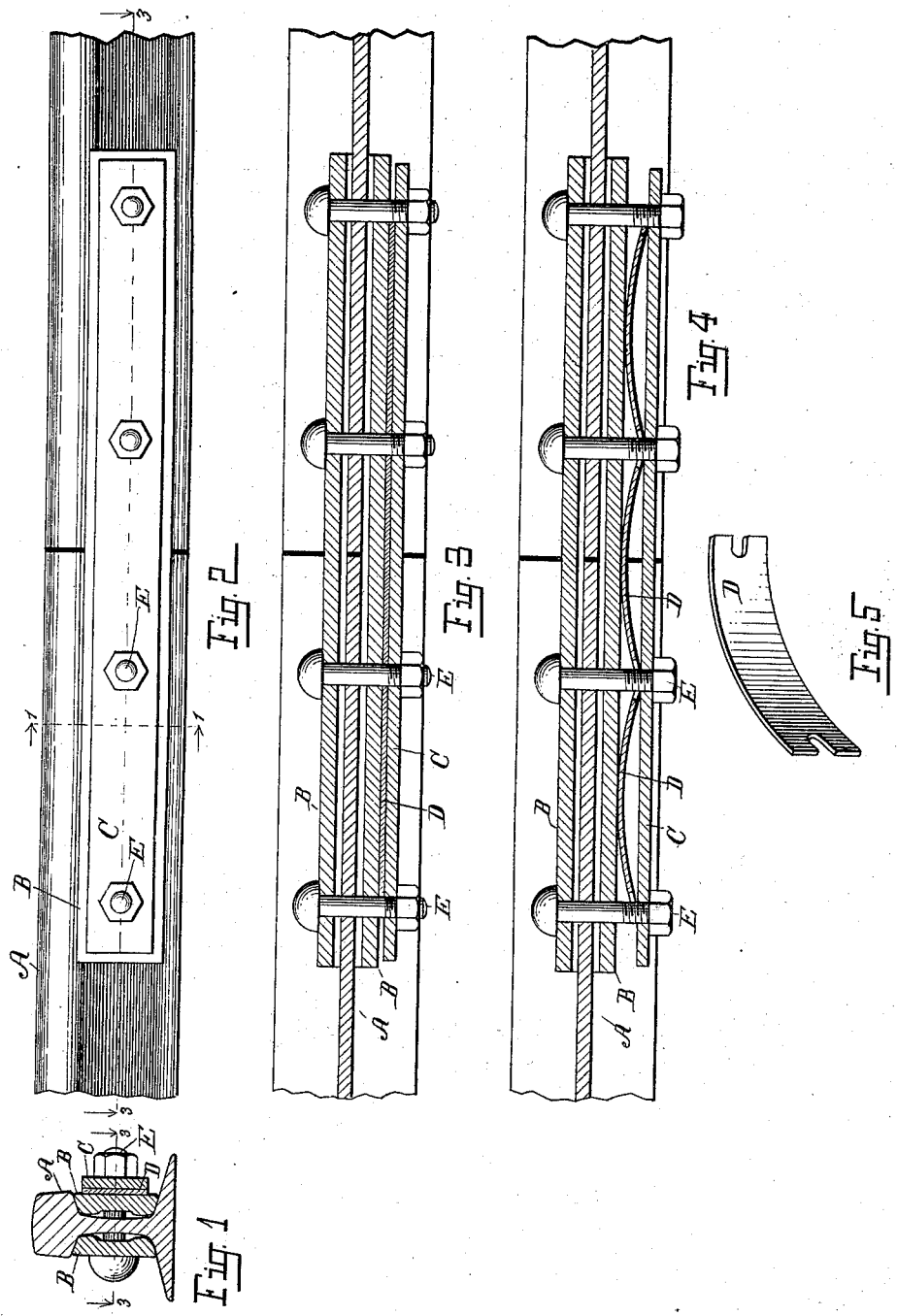
Witnesses:
Inventor,
Jasper P. Warner
By Fred L. Chappell
Atty.

UNITED STATES PATENT OFFICE.

JASPER P. WARNER, OF DECATUR, MICHIGAN.

NUT-LOCK AND RAIL-JOINT.

SPECIFICATION forming part of Letters Patent No. 546,107, dated September 10, 1895.

Application filed December 3, 1894. Serial No. 530,687. (No model.)

*To all whom it may concern:*

Be it known that I, JASPER P. WARNER, a citizen of the United States, residing at the village of Decatur, in the county of Van Buren and State of Michigan, have invented certain new and useful Improvements in Nut-Locks and Rail-Joints, of which the following is a specification.

My invention relates to improvements in rail-joints and means for preventing the nuts thereon being loosened from the ordinary jolting and motion of the rail caused by the passing of trains or other accidental causes.

The objects of my invention are, first, to provide a rail-joint which shall always act to hold the rail securely in position; second, one in which the construction of the joint itself prevents a loosening of the nuts upon the bolts; third, to provide a means whereby if for any reason the nut should not be turned tight the splice-bars or fish-plates would be held in place and accomplish their result; fourth, to simplify and cheapen the construction of rail-joints that shall be effective in their operation. I accomplish these objects of my invention by the devices shown in the accompanying drawings, in which—

Figure 1 presents a sectional view through a rail-joint embodying my invention, taken on line 1 1 of Fig. 2. Fig. 2 is a side elevation of the ends of two rails joined together by my improved device. Fig. 3 is a sectional view through the same, taken on line 3 3 of Fig. 2, looking down. Fig. 4 is also a sectional view on the same line looking in the same direction, showing my improved rail-joint in the course of application, the bolts not yet having been drawn tight. Fig. 5 presents a detail view of one of the spring portions D used in my improved rail-joint.

In the drawings similar letters of reference refer to similar parts throughout the several views.

Referring to the drawings, A represents the railroad-rails of any approved pattern.

B B represent the fish-plates or splice-bars, which may be same as any in common use.

E represents the bolts passing through the splice-bars and through the web of the rail. On the nut side of the bolts is placed an additional plate C, of the same length as the splice-bars. Between this plate C and the splice-bars B to that side of the rail are inserted curved springs D, having a little notch at the end to pass each side of the bolts E which assist in retaining them correctly in place back of the plate C. These springs are curved, so that the ends press out against the bar D, close to the bolts, and the convex portion rests against the side of the splice-bar B. These springs are very stiff, requiring pressure of about two thousand pounds to spring them down flat. The bars D present a flat surface under the bolt-heads and next to the same to increase friction. In use the nuts of the bolts are screwed down tight, so that the plate D presses the springs tight against the fish-bar B, and when the whole is bolted together the cross-section has the appearance (see Fig. 3) indicating that there are three strips of metal on this side of the rail. The strong spring presses the splice-bars firmly in place and would hold the rail were the nuts on the bolts not turned down tight. However, when they are turned down tight the constant strong pressure of about two thousand pounds is exerted on the same by the spring D against the bar B and against the under side of the nut with such force that it is impossible for the motion of passing trains to jar the nut to allow it to rotate upon the bolt and become loosened, and if the nut should receive a direct blow sufficient to turn it part way round, then the spring pressing against the same will prevent its being turned any farther. Thus it will be seen that it is only possible to turn the nuts of the bolts in this device by direct force upon the same and there is no possibility of their becoming loosened by the shaking or movement of the rails due to the motion of the passing trains, and yet they can be easily removed and used over and over again. I desire to state that with this construction the spring exercises its full force and presses the flat surface of the plate against the flat side of the nut with a very strong pressure, and thus secures it against any accidental indirect loosening.

Having thus described my improved rail-joint and nut-lock, I desire to state that it is capable of considerable variation without departing from my invention. The powerful springs will be found effective if placed under the heads of the bolts instead of under the nuts, and the parts can be otherwise transposed. The arrangement and construction I have shown, however, possesses the greatest merits and in use is perfect in its action.

Having thus described my invention, what I claim as new, and desire to secure by Letters Patent, is—

1. The combination with the rails, A, of the splice bars B, B, to each side of the web thereof; the bolts, E, extending therethrough; the plates, C; the curved springs, D, between the plate, C, and the splice bar, B, substantially as described and for the purpose specified.

2. The combination with the rails, A, of the spliced bars, B, B, to each side of the web thereof; the bolts, E, extending therethrough; the plate, C; the curved springs, D, notched at the ends to accommodate the ends of the bolts and be retained in position thereby between the plate, C, and the splice bar, B, substantially as described for the purpose specified.

3. The combination of the rails, A, the splice bars, B, B to each side of the web thereof; the bolts, E, extending therethrough; the plate, C; the curved springs, D, with the convex side toward the splice bar and between the said plate, C, and the splice bar, B, substantially as described.

4. The combination of the rails, A; the splice bars, B, to each side of the web thereof; the bolts, E, extending therethrough; and the springs, D, extending from one bolt to the next the convex side toward the splice bar and the notched ends engaging to each side of adjacent bolts to be compressed by the nuts thereof, for the purpose specified.

In witness whereof I have hereunto set my hand and seal in the presence of two witnesses.

JASPER P. WARNER. [L. S.]

Witnesses:
FRANK POTTS,
FRANK W. THOMAS.